(12) United States Patent
Satou

(10) Patent No.: US 11,245,775 B2
(45) Date of Patent: Feb. 8, 2022

(54) COMMUNICATION CONTROL DEVICE, COMMUNICATION CONTROL SYSTEM, MOUNTED DEVICE, COMMUNICATION CONTROL METHOD, AND PROGRAM

(71) Applicant: NEC CORPORATION, Tokyo (JP)

(72) Inventor: Masayuki Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 329 days.

(21) Appl. No.: 16/569,925

(22) Filed: Sep. 13, 2019

(65) Prior Publication Data

US 2020/0092393 A1 Mar. 19, 2020

(30) Foreign Application Priority Data

Sep. 18, 2018 (JP) .............................. JP2018-173417

(51) Int. Cl.
*H04L 29/08* (2006.01)
*H04L 29/06* (2006.01)
*H04W 4/44* (2018.01)
*G05D 1/00* (2006.01)
*H04L 29/12* (2006.01)
*H04W 72/04* (2009.01)

(52) U.S. Cl.
CPC ....... *H04L 67/2895* (2013.01); *G05D 1/0022* (2013.01); *H04L 61/2514* (2013.01); *H04L 63/0281* (2013.01); *H04W 4/44* (2018.02); *H04W 72/0406* (2013.01)

(58) Field of Classification Search
CPC ............. H04L 67/2895; H04L 63/0281; H04L 61/2514; H04W 72/0406; H04W 4/44; G05D 1/0022

USPC .......................................................... 701/2
See application file for complete search history.

(56) References Cited

U.S. PATENT DOCUMENTS

| 8,984,616 B2 * | 3/2015 | Jamrog ............... H04L 63/0815 726/12 |
| 11,082,408 B2 * | 8/2021 | Jones .................. H04L 63/0471 |
| 2012/0151204 A1 * | 6/2012 | Jamrog ............... H04L 63/0815 713/150 |
| 2015/0081846 A1 * | 3/2015 | Ur-Rahman ............ H04L 63/04 709/218 |
| 2015/0163315 A1 * | 6/2015 | Harnay .................... H04L 67/42 709/203 |
| 2017/0295131 A1 * | 10/2017 | Dyszynski ............ H04L 69/163 |
| 2019/0235882 A1 * | 8/2019 | Mishra ................ G06F 9/44505 |

FOREIGN PATENT DOCUMENTS

| JP | 2007-081971 | * | 3/2007 |
| JP | 2007-81971 A | | 3/2007 |

* cited by examiner

*Primary Examiner* — Muhammad Shafi
(74) *Attorney, Agent, or Firm* — Sughrue Mion, PLLC

(57) ABSTRACT

A communication control device selects, based on scenario information, one or more of a plurality of reverse proxy devices that transfer information transmitted and received between an information processing device and a mounted device of a moving body. The communication control device performs operation control of the selected reverse proxy device. The communication control device selects the scenario information used for operation of the reverse proxy device based on an operation start signal transmitted from the mounted device, and transmits the scenario information to the mounted device.

7 Claims, 9 Drawing Sheets

COMMUNICATION CONTROL DEVICE, COMMUNICATION CONTROL SYSTEM, MOUNTED DEVICE, COMMUNICATION CONTROL METHOD, AND PROGRAM

INCORPORATION BY REFERENCE

This application is based upon and claims the benefit of priority from Japanese patent application No. 2018-173417, filed Sep. 18, 2019, the disclosure of which is incorporated herein in its entirety by reference.

BACKGROUND OF THE INVENTION

Field of the Invention

The present invention relates to a communication control device, a communication control system, a mounted device, a communication control method, and a program.

Description of Related Art

Various equipment is mounted on a moving body such as a vehicle. The equipment mounted on the moving body transmits information to other equipment via a communication network referred to as a CAN (Controller Area Network) constructed inside the moving body. Further, devices mounted on a moving body such as a vehicle sometimes transmit moving body information transmitted and received by the CAN, to a predetermined information processing device. The information processing device performs predetermined processing using the moving body information.

The information processing device, which is the transmission destination of moving body information as described above, needs to enhance security against unauthorized access by a malicious third party. A technique that enhances security against unauthorized access is disclosed in Japanese Unexamined Patent Application, First Publication No. 2007-81971.

Japanese Unexamined Patent Application, First Publication No. 2007-81971 discloses a technique that switches a port number to be opened on the basis of a port number list, when performing communication between terminals.

Here, as described above, an information processing device which receives moving body information transmitted from each of a plurality of moving bodies, and communication control that ensures security by enhancing the degree of difficulty in accessing the moving body information are required.

SUMMARY OF THE INVENTION

Therefore, an object of the present invention is to provide a communication control device, a communication control system, a mounted device, a communication control method, and a program that solve the problems described above.

According to a first aspect of the present invention, a communication control device includes: a proxy operation control unit configured to select one or more of a plurality of reverse proxy devices that each perform transfer of information transmitted and received between an information processing device that performs predetermined processing using information transmitted by a mounted device which is mounted on a moving body, and the mounted device, based on scenario information that includes a plurality of combinations including at least an IP address and a port number of the reverse proxy device and a time point, and perform operation control of the selected reverse proxy device; and a scenario information transmission unit configured to select the scenario information used in the operation control of the reverse proxy device based on an operation start signal transmitted from the mounted device, and transmits the selected scenario information to the mounted device.

Furthermore, according to a second aspect of the present invention, a communication control system at least includes: a communication control device; a mounted device which is mounted on a moving body; and a plurality of reverse proxy devices, which each configured to perform transfer of information transmitted and received between an information processing device that performs predetermined processing using information transmitted from the mounted device, and the mounted device. The communication control device includes; a proxy operation control unit configured to select one or more of the plurality of reverse proxy devices based on scenario information that includes a plurality of combinations including at least an IP address and a port number of the reverse proxy device and a time point, and perform operation control of the selected reverse proxy device, and a scenario information transmission unit that selects the scenario information used in the operation control of the reverse proxy device based on an operation start signal transmitted from the mounted device, and transmit the selected scenario information to the mounted device. The mounted device includes; a moving body information transmission unit configured to transmit moving body information such that the moving body information of the moving body is transmitted to the information processing device via the reverse proxy device under the operation control based on a combination including the IP address, the port number, and the time point included in the scenario information.

Moreover, according to a third aspect of the present invention, a mounted device is connected to a communication control system that at least includes: a communication control device; a mounted device which is mounted on a moving body; and a plurality of reverse proxy devices, which each configured to perform transfer of information transmitted and received between an information processing device that performs predetermined processing using information transmitted from a mounted device, and the mounted device. The communication control device includes; a proxy operation control unit configured to select one or more of the plurality of reverse proxy devices based on scenario information that includes a plurality of combinations including at least an IP address and a port number of the reverse proxy device and a time point, and perform operation control of the selected reverse proxy device, and a scenario information transmission unit configured to select the scenario information used in the operation control of the reverse proxy device based on an operation start signal transmitted from the mounted device, and transmit the selected scenario information to the mounted device. The mounted device includes a moving body information transmission unit configured to transmit moving body information such that the moving body information of the moving body is transmitted to the information processing device via the reverse proxy device under the operation control based on a combination including the IP address, the port number, and the time point included in the scenario information.

In addition, according to a fourth aspect of the present invention, a communication control method causes a communication control device to perform the steps of: selecting one or more of a plurality of reverse proxy devices that each perform transfer of information transmitted and received between an information processing device that performs predetermined processing using information transmitted by a mounted device, and the mounted device, based on scenario information that includes a plurality of combinations including at least an IP address and a port number of the reverse proxy device and a time point; performing operation control of the selected reverse proxy device; selecting the scenario information used in the operation control of the reverse proxy device based on an operation start signal transmitted from the mounted device; and transmitting the selected scenario information to the mounted device.

Furthermore, according to a fifth aspect of the present invention, a non-transitory computer-readable recording medium storing a program causes a computer of a communication control device to perform processes, the processes include: selecting one or more of a plurality of reverse proxy devices that each perform transfer of information transmitted and received between an information processing device that performs predetermined processing using information transmitted by a mounted device, and the mounted device, based on scenario information that includes a plurality of combinations including at least an IP address and a port number of the reverse proxy device and a time point; performing operation control of the selected reverse proxy device; selecting the scenario information used in the operation control of the reverse proxy device based on an operation start signal transmitted from the mounted device; and transmitting the scenario information to the mounted device.

According to the present invention, it is possible to provide a communication control that ensures security by enhancing the degree of difficulty in accessing an information processing device which receives moving body information transmitted from each of a plurality of moving bodies, and the moving body information.

DETAILED DESCRIPTION OF THE INVENTION

Hereunder, a communication control system according to an embodiment of the present invention will be described with reference to the drawings.

Figure 1:
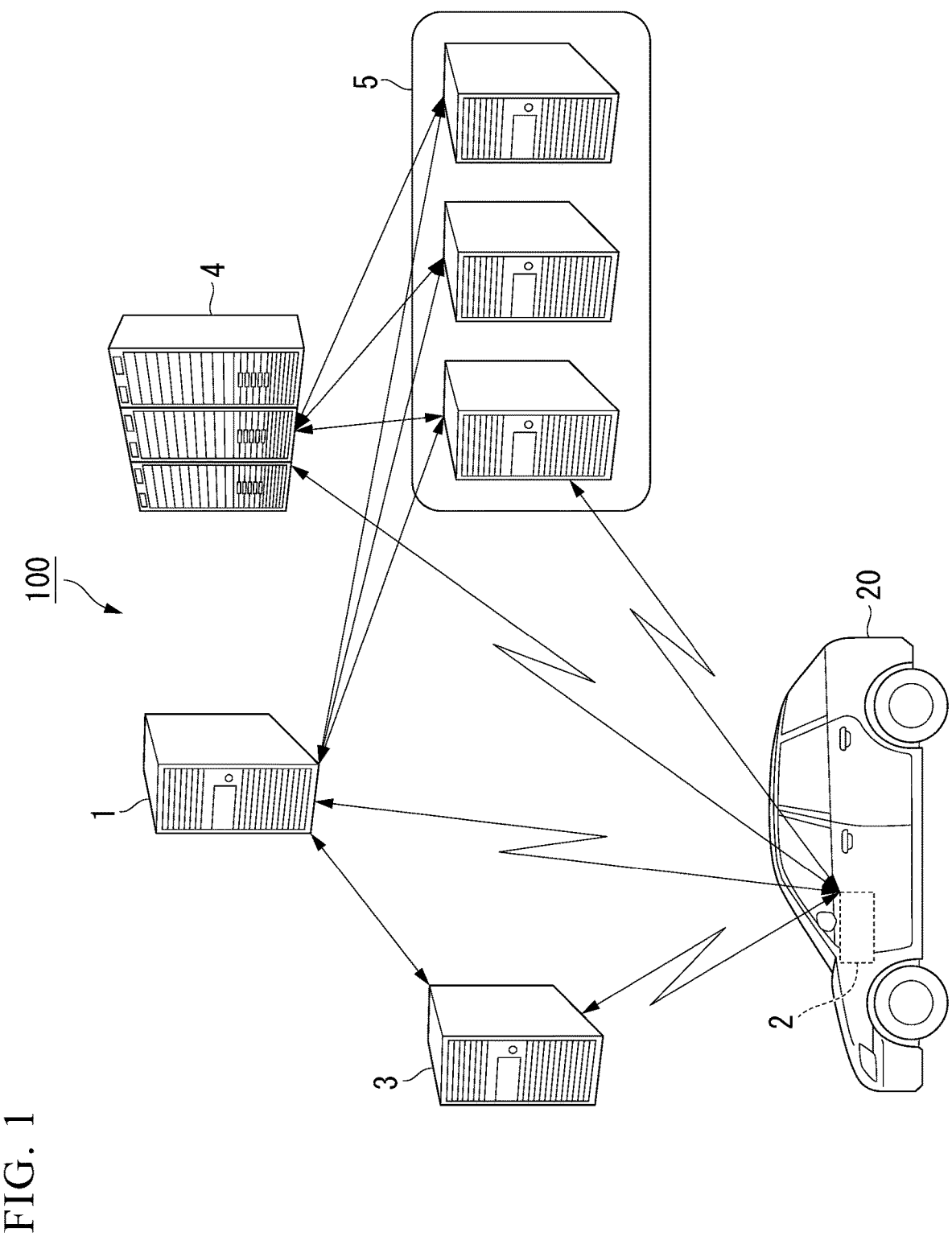
FIG. 1 is a diagram showing a configuration of a communication control system according to the present embodiment.

FIG. 1 is a diagram showing a configuration of a communication control system according to the present embodiment.

As shown in FIG. 1, the communication control system according to the present embodiment includes; a communication control device 1, a vehicle-mounted device 2, an authentication device 3, a moving body management device 4, and reverse proxy devices 5. The vehicle-mounted device 2 is mounted on a vehicle 20, which is one aspect of a moving body.

The communication control device 1 performs communication control with respect to moving body information transmitted from the vehicle 20 to the moving body management device 4. The communication control device 1 communicatively connects the authentication device 3 and each of the plurality of reverse proxy devices 5. Furthermore, the communication control device 1 communicatively connects to a vehicle-mounted device 2 mounted on the vehicle 20.

Figure 2:
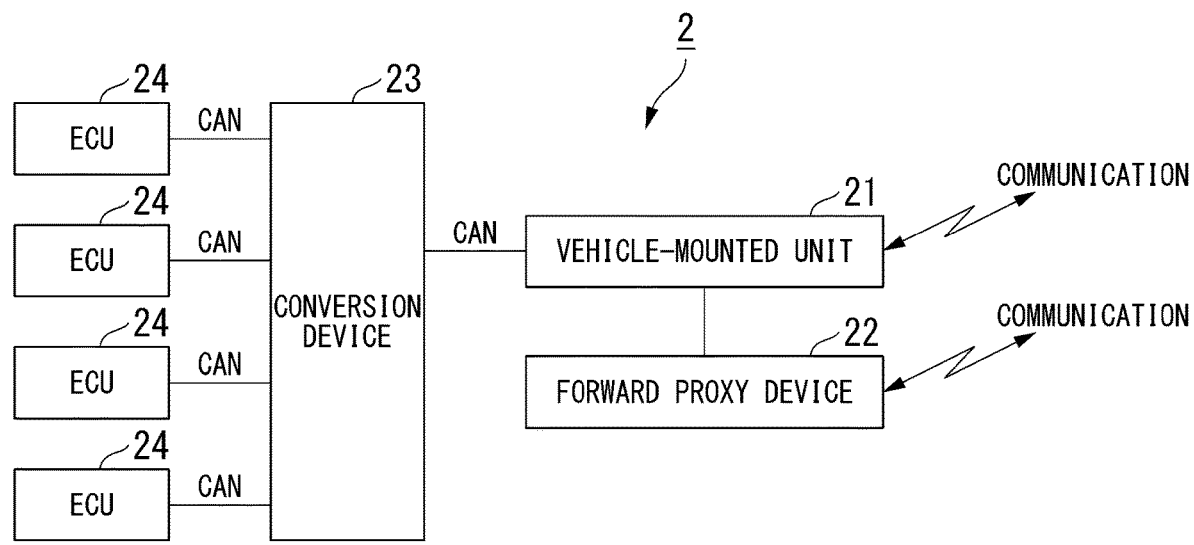
FIG. 2 is a diagram showing a detailed configuration of a vehicle-mounted device according to the present embodiment.

The vehicle-mounted device 2 is an example of a mounted device which is mounted on the vehicle 20, the vehicle 20 being one aspect of a moving body. More specifically, the vehicle-mounted device 2 is configured by a vehicle-mounted unit 21 (FIG. 2) and a forward proxy device 22 (FIG. 2).

The authentication device 3 performs authentication at the time the vehicle-mounted device 2 connects to the communication control system 100.

The moving body management device 4 receives vehicle information, which is an example of moving body information, from the vehicle-mounted device 2, and performs predetermined processing using the vehicle information. The moving body management device 4 may, as an example, be a device that performs automatic driving control with respect to a vehicle. The moving body management device 4 may be a device that performs processing other than automatic driving control. The moving body management device 4 is capable of directly communicatively connecting to the vehicle-mounted device 2 or the reverse proxy devices 5.

The reverse proxy devices 5 are provided on a communication network between the moving body management device 4 and the vehicle-mounted device 2. The reverse proxy devices 5 are devices that transfer vehicle information transmitted from the vehicle-mounted device 2 to the moving body management device 4. The reverse proxy devices 5 temporarily store the information transmitted by the moving body management device 4 to the vehicle-mounted device 2, and perform processing that transmits the information to the vehicle-mounted device 2 in place of the moving body management device 4. That is to say, the reverse proxy devices 5 are also installed for the purpose of reducing the processing load on the moving body management device 4 by performing information transmission processing in place of the moving body management device 4. A plurality of reverse proxy devices 5 are provided in the communication control system 100. The vehicle-mounted device 2 transmits vehicle information to the moving body management device 4 via one of the reverse proxy devices 5 among the plurality of reverse proxy devices 5.

In the present embodiment, an aspect will be described in which the moving body is the vehicle 20, the mounted device is the vehicle-mounted device 2, and the moving body information is vehicle information. However, the moving body does not have to be a vehicle. For example, the moving body may be an aircraft, a train, a drone, or the like. Further, the mounted device is provided inside such a moving body, and the mounted device may transmit to the moving body management device 4, the information (moving body information) generated inside the moving body to which the device itself is mounted.

Although not illustrated in FIG. 1, the network interface of the communication control device 1, the authentication device 3, the moving body management device 4, and each of the reverse proxy devices 5 may be provided with a security device such as a firewall.

The forward proxy device 22 (FIG. 2) forwards (transfers) the vehicle information transmitted from the vehicle-mounted unit 21 (FIG. 2) toward the moving body management device 4. The device is named a forward proxy device for this reason. Furthermore, the reverse proxy device 5 is a device that reverses (returns) response information in response to the vehicle information transmitted from the vehicle-mounted unit 21 toward the moving body management device 4. The device is named a reverse proxy device for this reason.

FIG. 2 is a diagram showing a detailed configuration of a vehicle-mounted device.

As shown in FIG. 2, the vehicle-mounted device 2 includes at least; a vehicle-mounted unit 21, a forward proxy device 22, a conversion device 23, and ECUs (Electronic Control Units) 24.

The vehicle-mounted unit 21 is connected to the ECUs 24 via the conversion device 23, and acquires various types of information. As shown in FIG. 2, communication is performed between the ECUs 24 and the conversion device 23, and between the conversion device 23 and the vehicle-mounted unit 21 according to a CAN. The vehicle-mounted unit 21 includes a communication function, and is capable of performing wireless communication with external devices.

The forward proxy device 22 connects to the vehicle-mounted unit 21. The forward proxy device 22 is connected, as an example, to a vehicle-mounted unit 21 originally mounted on the vehicle 20 by a maintenance person at the time of maintenance of the vehicle 20. The forward proxy device 22 is also capable of directly performing wireless communication with external devices.

In the present embodiment, the external devices with which the vehicle-mounted unit 21 and the forward proxy device 22 communicatively connect are the communication control device 1, the authentication device 3, the moving body management device 4, and the reverse proxy device 5. The functions of the forward proxy device 22 may be provided inside the vehicle-mounted unit 21.

Figure 3:
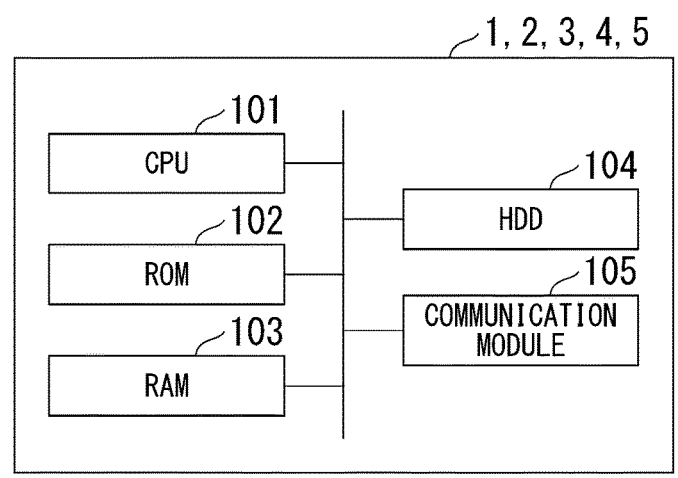
FIG. 3 is a diagram showing a hardware configuration of each of the devices according to the present embodiment.

FIG. 3 is a diagram showing a hardware configuration of each of the devices.

As shown in FIG. 3, the communication control device 1, the vehicle-mounted device 2, the authentication device 3, the reverse proxy devices 5, and the moving body management device 4 are each provided with, as an example, a hardware configuration including a CPU (Central Processing Unit) 101, a ROM (Read Only Memory) 102, a RAM (Random Access Memory) 103, an HDD (Hard Disk Drive) 104, and a communication module 105. The vehicle-mounted device 2 includes a wireless communication module or a CAN-compatible wired communication module as the communication module 105. The communication control device 1, the authentication device 3, the reverse proxy devices 5, and the moving body management device 4 are each computers having the hardware configuration shown in FIG. 3.

Figure 4:
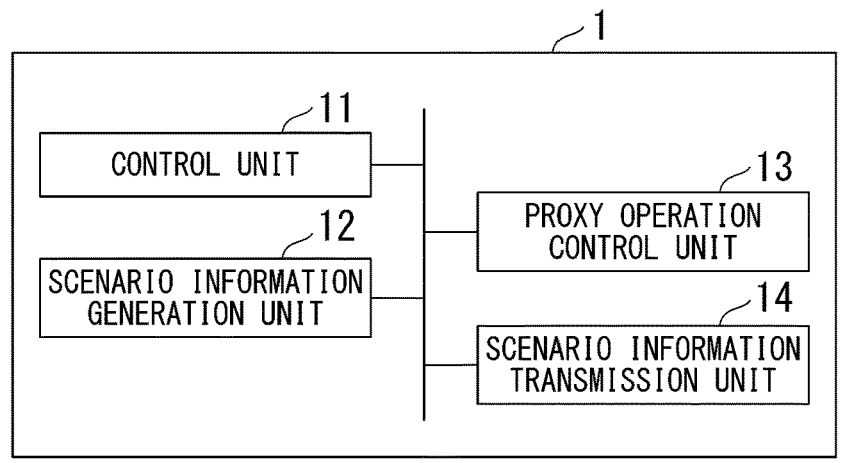
FIG. 4 is a functional block diagram of a communication control device according to the present embodiment.

FIG. 4 is a functional block diagram of a communication control device.

The communication control device 1 executes a communication control program at the time of startup. As a result, the communication control device 1 is internally provided with the functions of a control unit 11, a scenario information generation unit 12, a proxy operation control unit 13, and a scenario information transmission unit 14.

The control unit 11 controls the functional units of the communication control device 1.

The scenario information generation unit 12 generates scenario information. The scenario information is information which includes a plurality of combinations including at least an IP address of a reverse proxy device 5, a port number, and a time point. The scenario information generation unit 12 generates a plurality of scenario information elements in which a plurality of combinations including different IP addresses, port numbers, and time points are listed. The scenario information, for example, includes pairs including an IP address and a port number at each time point in a time series.

The proxy operation control unit 13 selects one or more of the plurality of reverse proxy devices 5 on the basis of the scenario information, and performs operation control of the selected reverse proxy devices 5.

The scenario information transmission unit 14 selects, on the basis of an operation start signal transmitted from the vehicle-mounted device 2, one scenario information element from among the one or more scenario information elements used to operate the reverse proxy devices 5, and transmits the scenario information to the vehicle-mounted device 2.

Figure 5:
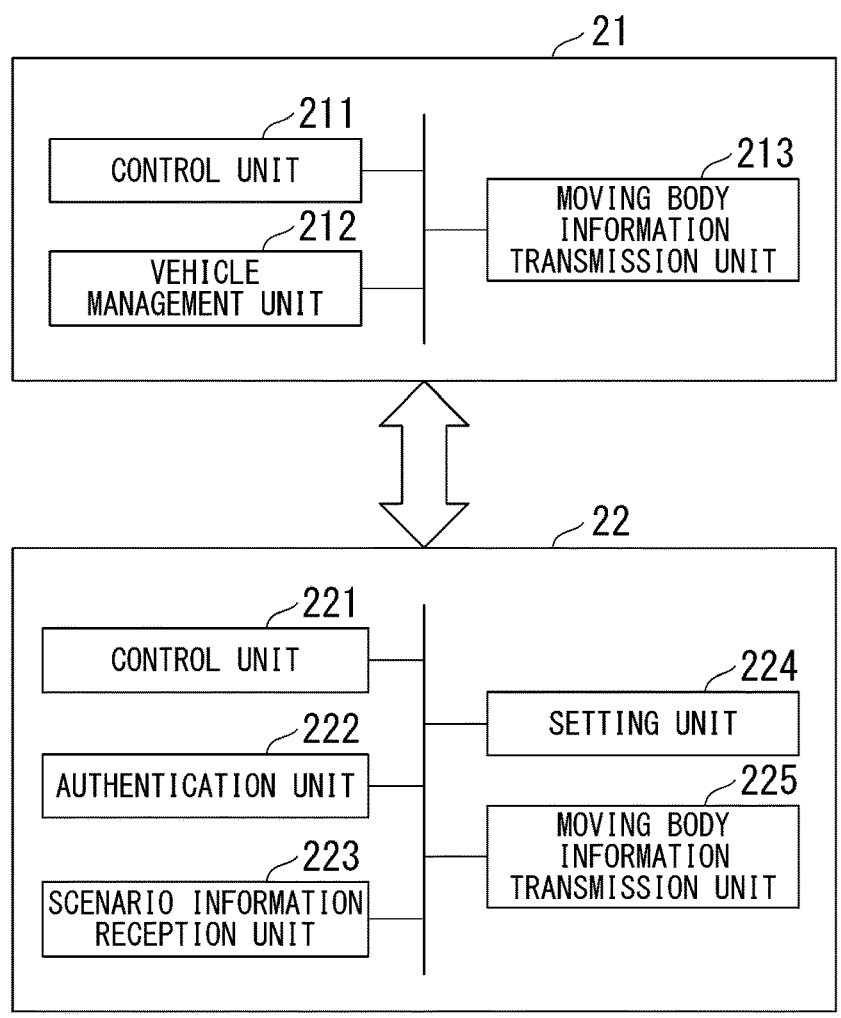
FIG. 5 is a functional block diagram of a vehicle-mounted unit and a forward proxy device according to the present embodiment.

FIG. 5 is a functional block diagram of a vehicle-mounted unit and a forward proxy device 22.

The vehicle-mounted unit 21 executes a vehicle management program at the time of startup. As a result, the vehicle-mounted unit 21 is internally provided with the functions of a control unit 211, a vehicle management unit 212, and a moving body information transmission unit 213.

The control unit 211 controls the functional units of the vehicle-mounted unit 21.

The vehicle management unit 212 performs predetermined vehicle management processing on the basis of information acquired from the ECUs 24 and the like via the conversion device 23.

The moving body information transmission unit 213 directly transmits the vehicle information to the moving body management device 4 on the basis of the vehicle information type. More specifically, if the vehicle information type indicates "non-important", the moving body information transmission unit 213 directly transmits the vehicle information to the moving body management device 4.

The forward proxy device 22 executes a proxy processing program at the time of startup. As a result, the forward proxy device 22 is internally provided with the functions of a control unit 221, an authentication unit 222, a scenario information reception unit 223, a setting unit 224, and a moving body information transmission unit 225.

The control unit 221 controls the functional units of the forward proxy device 22.

The authentication unit 222 transmits an operation start signal indicating an authentication request, to the authentication device 3 at the time the vehicle-mounted device 2 connects to the communication control system 100.

The scenario information reception unit 223 receives the scenario information transmitted from the communication control device 1 in response to the transmission of the operation start signal.

The setting unit 224 selects the reverse proxy device 5 that serves as the transmission destination of the vehicle information, based on information listed in the scenario information, which includes a plurality of combinations including an IP address, a port number, and a time point. The setting unit 224 refers to the scenario information to acquire a pair including an IP address and a port number based on the time point, and selects the reverse proxy device 5 corresponding to the acquired IP address and port number as the transmission destination. The setting unit 224 sets the IP address of the reverse proxy device 5 that serves as the transmission destination, and the port number, as the destination of the vehicle information. Specifically, the setting unit 224 records the IP address of the selected reverse proxy device 5, and the port number, to the destination information referenced by the moving body information transmission unit 225.

The moving body information transmission unit 225 transmits the vehicle information toward the IP address of the reverse proxy device 5 and the port number listed in the destination information, based on the vehicle information type. Specifically, if the vehicle information type indicates "important", the moving body information transmission unit 225 transmits the vehicle information toward the IP address of the reverse proxy device 5 and the port number listed in the destination information.

Further, as a result of the processing of each of the devices described above, the forward proxy device 22 transmits, based on the scenario information, the important information to the moving body management device 4 via the reverse proxy device 5. In the forward proxy device 22, the vehicle-mounted unit 21 directly transmits non-important information to the moving body management device 4. The forward proxy device 22 successively changes the reverse proxy device 5 that relays the important information to the moving body management device 4, based on the scenario information.

In this manner, if the vehicle information type indicates "non-important", the forward proxy device 22 transmits the vehicle information to the moving body management device 4 without passing through the reverse proxy device 5. Furthermore, if the vehicle information type indicates "important", the forward proxy device 22 transmits the vehicle information to the moving body management device 4 via the reverse proxy device 5 selected according to the scenario information. Consequently, if the vehicle information is important information, it is possible to transmit the vehicle information to the moving body management device 4 via a reverse proxy device 5 and a port that change according to the time point.

As a result of the processing of each of the devices in such a communication control system 100, it is possible to enhance the difficulty for a malicious third party to access the reverse proxy devices 5 and the moving body management device 4 which receive vehicle information transmitted from each of a plurality of vehicles 20, and to access the vehicle information itself. Consequently, in the communication control system 100, it is possible to provide a communication control that ensures security.

Next, the processing flow of the communication control system 100 will be described.

First, at the time of maintenance of the vehicle 20, the maintenance person operates the authentication device 3 and instructs the authentication device 3 to generate a client certificate. Consequently, the authentication device 3 generates client certificate data. Furthermore, the authentication device 3 generates an authentication number such as an ID, a password, or a PIN of the vehicle 20. The maintenance person records the client certificate data to the forward proxy device 22. Moreover, the maintenance person notifies the authentication number to the owner of the vehicle 20.

The forward proxy device 22 includes a storage unit referred to as an HSM (Hardware Security Module) that confidentially stores confidential information. The maintenance person writes the client certificate to the storage unit. The client certificate may include information for uniquely specifying the forward proxy device 22 and the vehicle 20, and key information such as secret key information.

The authentication device 3 stores the generated client certificate data in association with the authentication number. In addition to the client certificate data and the authentication number, the authentication device 3 may further associate and store attribute information that has been input, such as the name and age of the owner of the vehicle 20.

Then, the maintenance person attaches the forward proxy device 22 to the vehicle-mounted unit 21. As a result of connecting the forward proxy device 22 to the vehicle-mounted unit 21, the vehicle-mounted unit 21 of the vehicle 20 can connect to the communication control system 100 via the forward proxy device 22.

Figure 6:
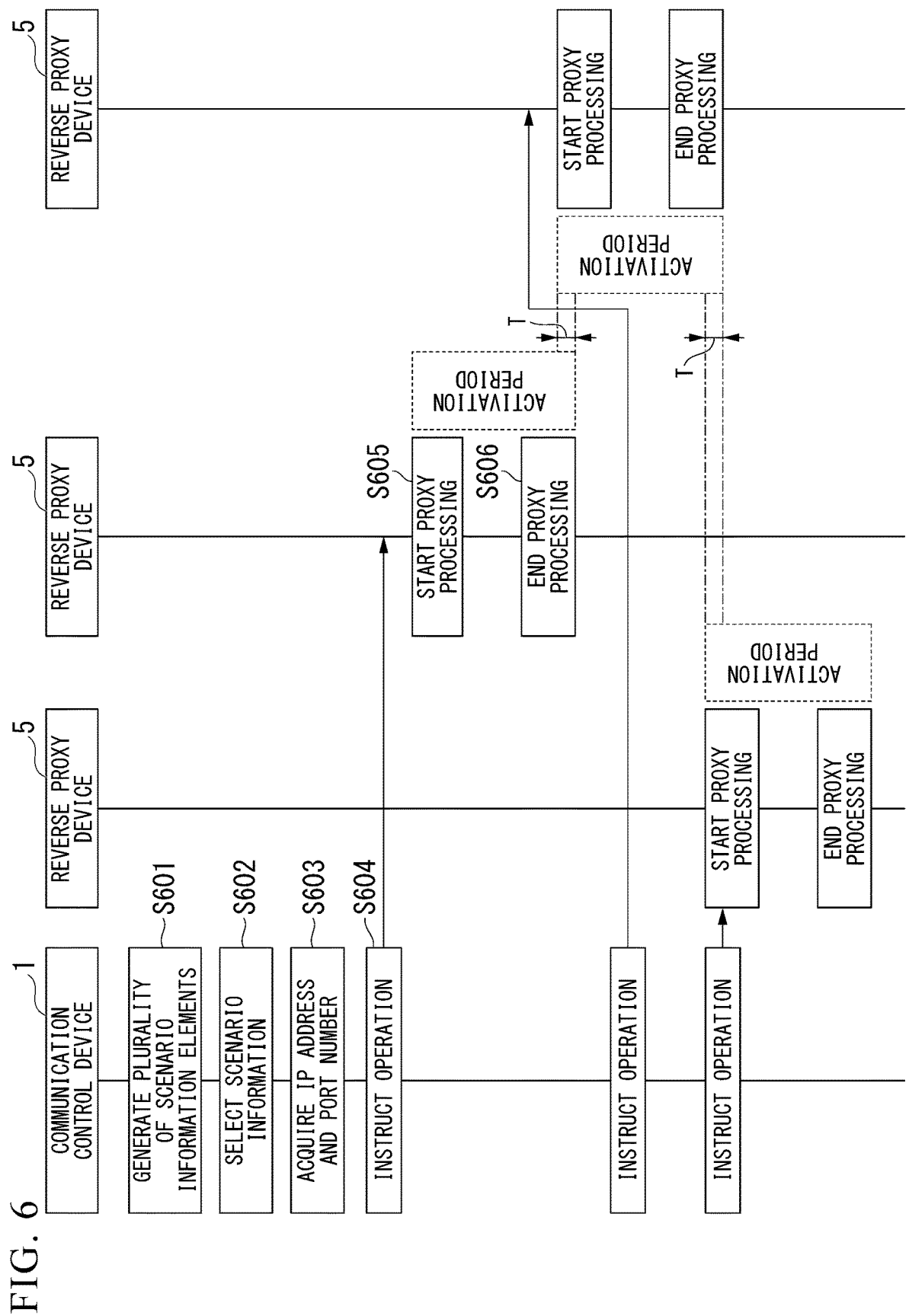
FIG. 6 is a first diagram showing a processing flow of the communication control system according to the present embodiment.

FIG. 6 is a first diagram showing a processing flow of the communication control system 100.

Next, scenario information generation processing of the communication control device 1 and operation control of the reverse proxy device 5 will be described.

The scenario information generation unit 12 of the communication control device 1 generates a plurality of scenario information elements (step S601). Each scenario information element records a plurality of combinations including an IP address of a reverse proxy device 5, a port number, and a time point. As an example, in the information relating to the combinations, the IP address of the reverse proxy device 5 and the port number successively change every five minutes. The IP address may be an IP address of a reverse proxy device 5 that changes in sequence with the time points. Furthermore, the port number may also be a number that successively changes.

The scenario information, for example, lists a plurality of time points in a time series. The IP address listed in the scenario information may, for example, change according to the time points, or may be the same in some periods with successive time points. The port number may also change according to the time points, or may be the same in some periods with successive time points. For example, depending on the time point, the IP address may be unchanged and only the port number may change. Alternatively, depending on the time point, the port number may be unchanged and only the IP address may change.

It is assumed that the time points included in the scenario information are time points at fixed intervals up to a predetermined future time point based on the current time. The predetermined future time point is, for example, a time point 24 hours later based on the current time point. The scenario information generation unit 12 may discard the generated scenario information after 24 hours have elapsed, and may newly generate a plurality of scenario information elements in the same manner one hour before the 24 hours elapse.

After the plurality of scenario information elements has been generated, the proxy operation control unit 13 of the communication control device 1 selects one scenario information element therefrom (step S602). Furthermore, the proxy operation control unit 13 acquires from within the selected scenario information, the IP address and the port number recorded in association with the nearest (closest) time point, which is a time point ahead of the current time point (step S603).

The proxy operation control unit 13 instructs the reverse proxy device 5 of the acquired IP address to operate by opening the port corresponding to the acquired port number (step S604). The reverse proxy device 5 that receives the instruction opens the port corresponding to the port number instructed by the proxy operation control unit 13, and starts proxy processing (step S605). After opening the port and starting proxy processing, the reverse proxy device 5 continues the proxy processing for an activation period, which corresponds a time interval listed in the scenario information. The activation period may, for example, be a time interval listed in the scenario information. Furthermore, the activation period may, for example, be a period in which the same IP address and port number combination continues in the scenario information. The reverse proxy device 5 closes the port and terminates proxy processing after the activation period elapses (step S606).

The scenario information lists the plurality of IP addresses and port numbers such that the IP address and the port number that receives the vehicle information is changed during the activation period. Based on the scenario information, the proxy operation control unit 13 may perform control such that the IP address and the port number of the same reverse proxy device 5 that receives the vehicle information is changed during the activation period. The reverse proxy device 5 may store time information relating to the activation period in advance, or may acquire the time information from the proxy operation control unit 13 of the communication control device 1. Alternatively, the reverse proxy device 5 may receive notification of the end of the activation period from the proxy operation control unit 13.

The proxy operation control unit 13 uses the plurality of scenario information elements to simultaneously perform operation control of equivalent reverse proxy devices 5. Furthermore, the proxy operation control unit 13 acquires the IP address and the port number recorded in association with the next time point in the scenario information, at a predetermined time such as one minute before or 30 seconds before the end of the activation period. The proxy operation control unit 13 uses the IP address and the port number to repeatedly perform operation control of the reverse proxy device 5 in the same manner.

At this time, the proxy operation control unit 13 controls the reverse proxy devices 5 such that an inactive period does not occur due to the activation period of a given reverse proxy device 5 not overlapping with that of any other reverse proxy device 5. That is to say, the proxy operation control unit 13 controls the reverse proxy devices 5 such that the activation period of a given reverse proxy device 5 overlaps with that of another reverse proxy device 5 for a period T. Furthermore, scenario information is generated that associates time points, IP addresses, and port numbers to enable such a control. Moreover, the proxy operation control unit 13 may refer to the scenario information to control the reverse proxy devices 5 in advance such that the activation period of the current reverse proxy device 5 overlaps with that of the next reverse proxy device 5.

As a result of such processing, the plurality of reverse proxy devices 5 each perform proxy processing during the activation period based on the plurality of scenario information elements. After the activation period ends, the reverse proxy devices 5 that do not acquire a subsequent operation instruction stop proxy processing and stand by.

Figure 7:
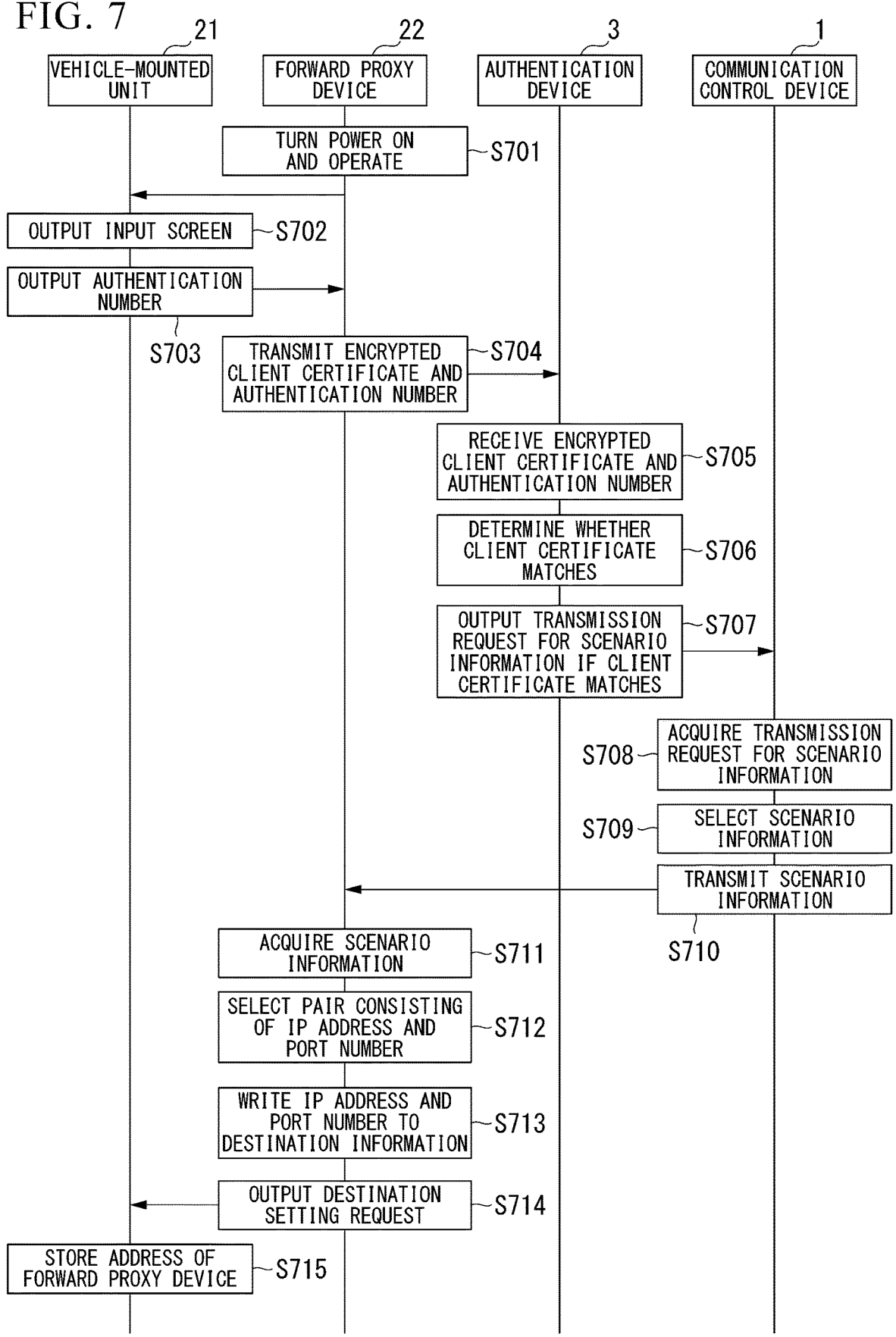
FIG. 7 is a second diagram showing the processing flow of the communication control system according to the present embodiment.

FIG. 7 is a second diagram showing the processing flow of the communication control system 100.

Next, processing that determines which reverse proxy device 5 serves as the destination of the vehicle information after operation of the vehicle 20 will be described.

When the vehicle 20 is started, the power of the vehicle-mounted unit 21 and the forward proxy device 22 are turned ON and start operating (step S701). The control unit 211 of the vehicle-mounted unit 21 includes an input/output device such as a touch panel monitor. The control unit 211 of the vehicle-mounted unit 21 outputs an input screen prompting input of an ID, a password, a PIN or the like based on control by the forward proxy device 22 (step S702). When the control unit 211 of the vehicle-mounted unit 21 receives input of an authentication number, such as an ID, a password, or a PIN, it outputs the authentication number to the forward proxy device 22 (step S703).

The authentication unit 222 of the forward proxy device 22 acquires the authentication number. Furthermore, the authentication unit 222 acquires a client certificate from the storage unit. The authentication unit 222 encrypts the client certificate using a secret key. The authentication unit 222 transmits the encrypted client certificate and the authentication number acquired from the vehicle-mounted unit 21, to the authentication device 3 (step S704). That is to say, the authentication unit 222 transmits an operation start signal indicating an authentication request, to the authentication device 3.

The authentication device 3 receives the client certificate and the authentication number (step S705). The authentication device 3 acquires a public key of the vehicle 20, and decrypts the encrypted client certificate. The authentication device 3 compares the decrypted client certificate and the client certificate of the vehicle 20 stored in advance, and determines whether or not the two match each other (step S706).

If the client certificates match, the authentication device 3 determines whether or not the received authentication number and the authentication number stored in advance match each other. If the client certificate and the authentication number each match the comparison target, the authentication device 3 outputs a transmission request for scenario information to the communication control device 1 (step S707). The transmission request includes the network address of the forward proxy device 22.

In the present embodiment, the authentication device 3 authenticates the forward proxy device 22 using a public key encryption method and an authentication number. However, it is not limited to such an example. The authentication device 3 may perform authentication by another authentication method. The authentication procedure described above is an example.

The scenario information transmission unit 14 of the communication control device 1 acquires the transmission request for scenario information (step S708). The scenario information transmission unit 14 randomly selects, among a plurality of scenario information elements generated in advance, one scenario information element from the plurality of scenario information elements used for operation control of the reverse proxy device 5 (step S709). That is to say, the scenario information transmission unit 14 selects one scenario information element from the plurality of scenario information elements generated in advance. As a result of selecting one scenario information element from the plurality of scenario information elements, the difficulty of access by a third party can be further enhanced.

The scenario information transmission unit 14 may select the scenario information on the basis of position information included in the operation start signal. The operation start signal includes, for example, position information indicating the position of the vehicle-mounted device 2. The position information is, for example, position information according to a GPS. The scenario information transmission unit 14 may, for example, distribute the scenario information to be transmitted to a plurality of vehicle-mounted devices 2 positioned nearby, based on the position information of the plurality of vehicle-mounted devices 2. The scenario information transmission unit 14 may, for example, perform control such that different scenario information elements are more readily transmitted to the plurality of vehicle-mounted devices 2 positioned nearby. As a result, it is possible to distribute the communication load, and the difficulty of access by a third party can also be further enhanced.

The scenario information transmission unit 14 transmits the selected scenario information to the network address of the forward proxy device 22 included in the transmission request (step S710). As a result, the scenario information reception unit 223 of the forward proxy device 22 acquires the scenario information (step S711). In this manner, the scenario information reception unit 223 receives the scenario information transmitted from the communication control device 1 in response to transmission of the operation start signal. The scenario information reception unit 223 outputs the scenario information to the setting unit 224.

When the setting unit 224 receives the scenario information, it selects one combination from the plurality of combinations including IP addresses and port numbers, on the basis of the current time point (step S712). For example, if the current time point is between the plurality of time points listed in the scenario information, which have a predetermined interval, the setting unit 224 may select from the time points before and after the current time point, a pair including an IP address and a port number listed in the scenario information which is associated with the previous time point.

The setting unit 224 writes the IP address of the selected reverse proxy device 5 and the selected port number to the destination information referenced by the moving body information transmission unit 225 (step S713). The destination information is recorded in a storage unit of the forward proxy device 22. Then, the setting unit 224 outputs to the vehicle-mounted unit 21, a destination setting request which includes the address of the forward proxy device as the destination of the vehicle information whose type indicates "important" (step S714). The vehicle-mounted unit 21 stores the address of the forward proxy device as the destination of the vehicle information whose type indicates "important" (step S715). As a result, the vehicle-mounted unit 21 outputs the vehicle information whose type indicates "important" to the forward proxy device 22. Consequently, the vehicle information whose type indicates "important" is transmitted to the reverse proxy device 5 via the forward proxy device 22.

Figure 8:
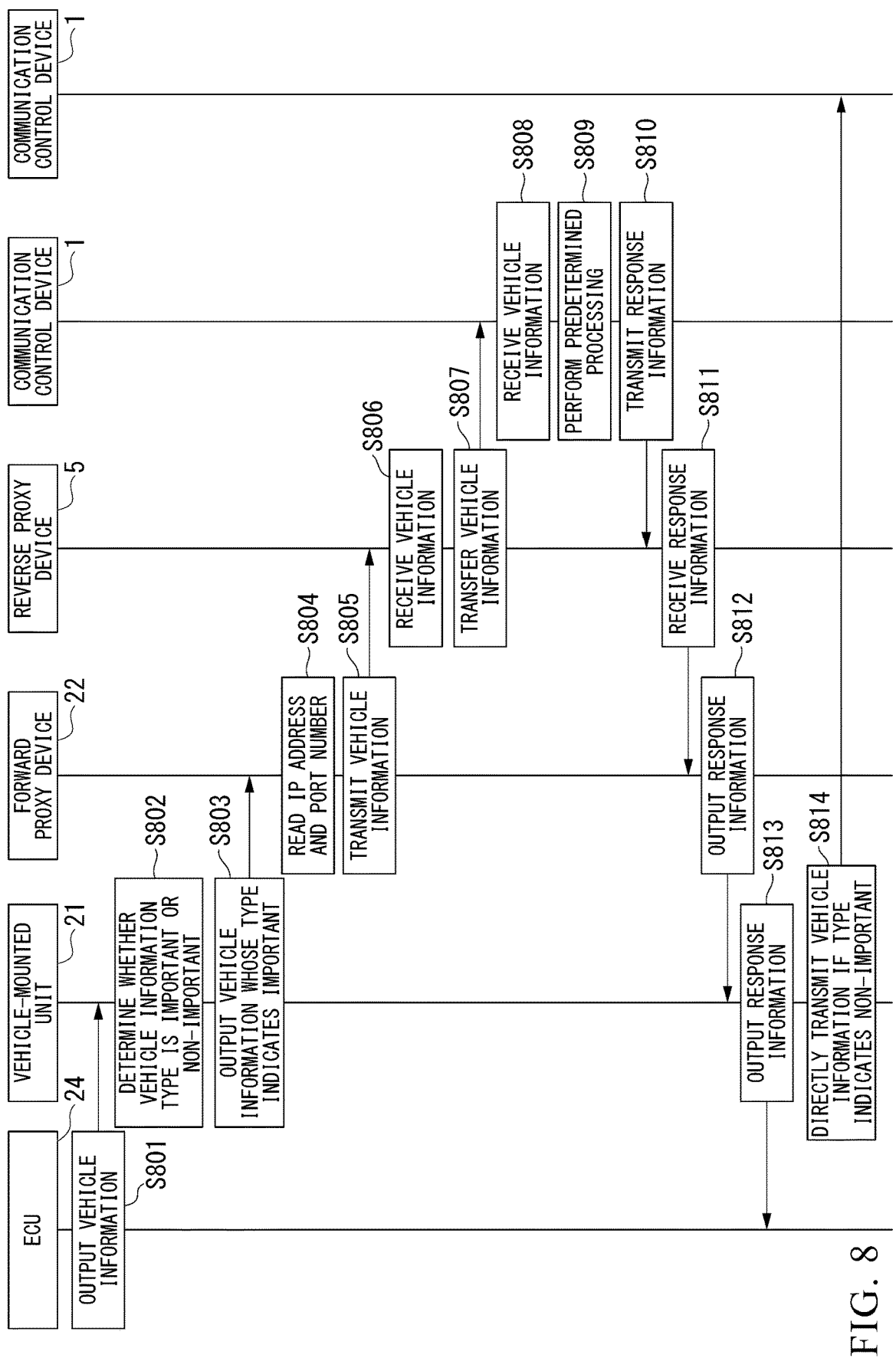
FIG. 8 is a third diagram showing the processing flow of the communication control system according to the present embodiment.

FIG. 8 is a third diagram showing the processing flow of the communication control system 100.

Next, the processing performed at the time the vehicle information is transmitted to the moving body management device 4 will be described.

After operation of the vehicle 20, the ECUs 24 of the vehicle 20 each output vehicle information to the vehicle-mounted unit 21 (step S801). The vehicle-mounted unit 21 stores the vehicle information to be transmitted to the moving body management device 4. Then, the moving body information transmission unit 213 of the vehicle-mounted unit 21 determines whether the type of the vehicle information to be transmitted to the moving body management device 4 is "important" or "non-important" (step S802).

For example, the vehicle-mounted unit 21 associates the content of the vehicle information with importance type information that indicates "important" or "non-important", and stores the information in a storage unit or the like. Then, the moving body information transmission unit 213 of the vehicle-mounted unit 21 reads the importance type information corresponding to the content of the vehicle information, and determines whether the importance type is "important" or "non-important". That is to say, the moving body information transmission unit 213 determines whether or not the vehicle information is important on the basis of the type information associated with the vehicle information. The moving body information transmission unit 213 outputs the vehicle information whose type indicates "important" to the forward proxy device 22 (step S803).

The moving body information transmission unit 225 of the forward proxy device 22 acquires the vehicle information from the vehicle-mounted unit 21. Then, the moving body information transmission unit 225 reads the IP address of the destination reverse proxy device 5 and the port number from the destination information recorded in the storage unit (step S804). The moving body information transmission unit 225 transmits the vehicle information which has the read IP address and read port number as the destination (step S805). As a result, the reverse proxy device 5 indicated by the IP address read by the moving body information transmission unit 225 receives the vehicle information at the port number indicated by the vehicle information (step S806).

The reverse proxy device 5 transfers the received vehicle information to the moving body management device 4 (step S807). The moving body management device 4 receives the vehicle information from the reverse proxy device 5 (step S808). The moving body management device 4 uses the received vehicle information to perform predetermined processing (step S809).

If the moving body management device 4 transmits response information to the vehicle-mounted device 2 side in response to receiving the vehicle information, it transmits the response information to the reverse proxy device 5 that relayed the vehicle information (step S810). The reverse proxy device 5 transmits the response information to the forward proxy device 22 (step S811). If the response information is used by the vehicle-mounted unit 21 or the ECUs 24, the forward proxy device 22 outputs the response information to the vehicle-mounted unit 21 (step S812). The vehicle-mounted unit 21 outputs the response information to the ECUs 24 (step S813).

In the processing above, the moving body information transmission unit 213 of the vehicle-mounted unit 21 determines whether the vehicle information type is "important" or "non-important" at fixed intervals, or each time vehicle information is received from the ECUs 24. Then, if the vehicle information type is "important", the moving body information transmission unit 213 repeats the processing that transmits the vehicle information to the forward proxy device 22. Furthermore, the moving body information transmission unit 225 of the forward proxy device 22 similarly repeats the processing that transmits the vehicle information to a reverse proxy device 5 on the basis of the IP address and the port number listed in the destination information, each time vehicle information is acquired from the vehicle-mounted unit 21.

In step S802 above, if the vehicle information is non-important information, the moving body information transmission unit 213 of the vehicle-mounted unit 21 determines that the vehicle information whose type indicates "non-important" is directly transmitted to the moving body management device 4 from the device itself. Further, the vehicle-mounted unit 21 directly transmits the vehicle information to a predetermined moving body management device 4 (step S814). For example, the moving body management device 4 that receives vehicle information whose type indicates "important" is assumed to be different from the moving body management device 4 that receives vehicle information whose type indicates "non-important". Alternatively, the moving body management device 4 that receives vehicle information whose type indicates "important" may be the same as the moving body management device 4 that receives vehicle information whose type indicates "non-important".

The moving body management device 4 receives vehicle information whose type indicates "non-important" without the vehicle information being passing through the forward proxy device 22 or the reverse proxy device 5. The moving body management device 4 uses the received "non-important" vehicle information to perform predetermined processing. The moving body management device 4 may transmit response information to the vehicle-mounted device 2 side in response to receiving the vehicle information.

Figure 9:
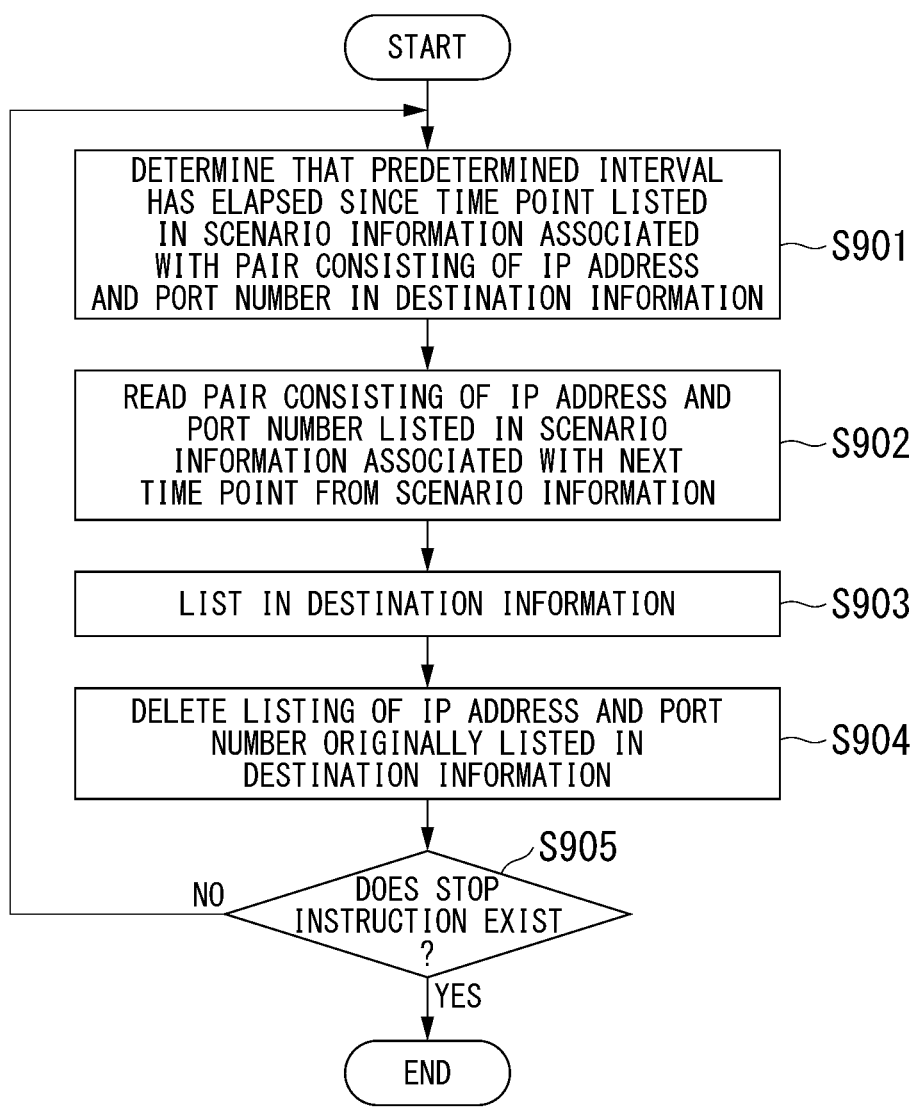
FIG. 9 is a flowchart showing destination setting processing according to the present embodiment.

FIG. 9 is a flowchart showing destination setting processing in a forward proxy device.

The setting unit 224 of the forward proxy device 22 updates the destination listed in the destination information at each predetermined interval on the basis of the scenario information. Specifically, the setting unit 224 determines that a predetermined interval has elapsed since the time point listed in the scenario information, which is associated with the pair including an IP address and a port number listed in the destination information which is currently set (step S901). The predetermined interval may be the same as the time interval listed in the scenario information. Then, the setting unit 224 reads from the scenario information the pair including an IP address and a port number listed in the scenario information associated with the next time point (step S902).

The setting unit 224, for example, determines whether or not the predetermined interval has elapsed since the time point associated with the pair including an IP address and a port number representing the current destination in the scenario information. If the predetermined interval has elapsed, the setting unit 224 reads and acquires from the scenario information, the pair including an IP address and a port number associated with the next time point.

The setting unit 224 lists the read IP address and port number in the destination information (step S903), and deletes the listing of the IP address and the port number originally listed in the destination information (step S904). The setting unit 224, for example, deletes the set IP address and port number from the destination information, and newly sets to the destination information, the IP address and port number associated with the next time point. For example, if the set IP address and port number are the same as the IP address and the port number associated with the next time point, the setting unit 224 does not have to update the destination information.

The setting unit 224 determines whether or not a stop instruction from the control unit 221 exists (step S905). The setting unit 224 repeats the processing that updates the destination information on the basis of the scenario information (S901 to S904) until a stop instruction is received. The setting unit 224 ends the processing when a stop instruction is received (YES in step S905).

Figure 10:
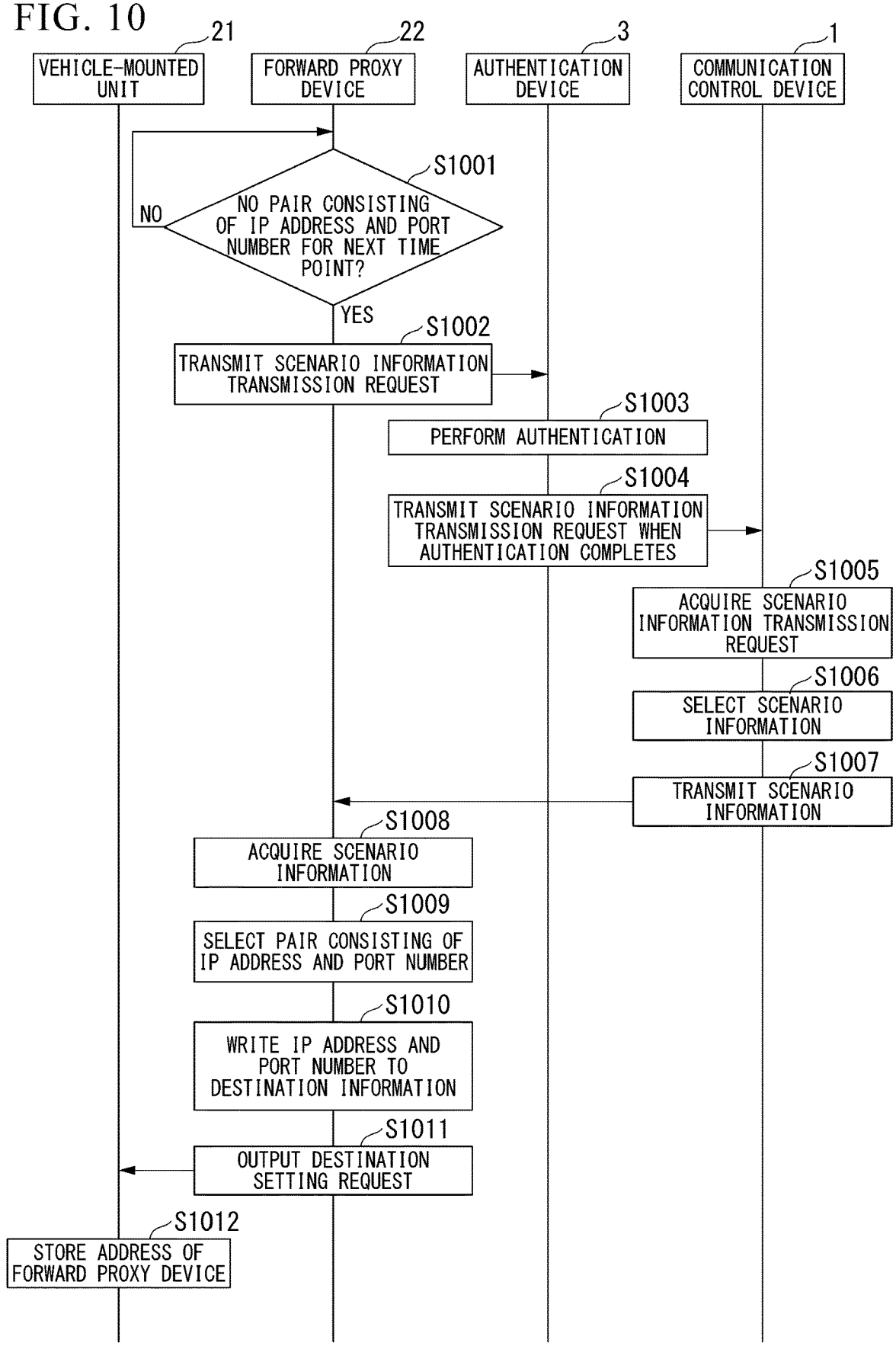
FIG. 10 is a fourth diagram showing the processing flow of the communication control system according to the present embodiment.

FIG. 10 is a fourth diagram showing the processing flow of the communication control system.

Next, retransmission processing of scenario information by the forward proxy device 22 will be described using FIG. 10.

The setting unit 224 determines whether or not an update to the destination information, which is based on a pair including an IP address and a port number, is completed for all time points listed in the scenario information, and no pair including an IP address and a port number exists for the next time point (step S1001). If there is no listing of a pair including an IP address and a port number for the next time point in the scenario information (YES in step S1001), the setting unit 224 transmits a scenario information transmission request to the authentication device 3 (step S1002). The authentication device 3 performs authentication of the forward proxy device 22 in the same manner as described above (step S1003). For example, the authentication device 3 performs authentication as described above for steps S705 to S706 in FIG. 7. After completing authentication, the authentication device 3 transmits a scenario information transmission request to the communication control device 1 (step S1004). The authentication device 3 transmits a scenario information transmission request if authentication is successful.

The scenario information transmission unit 14 of the communication control device 1 acquires the transmission request for scenario information (step S1005). The scenario information transmission unit 14 randomly selects, from a plurality of scenario information elements generated in advance, one scenario information element from the plurality of scenario information elements used for operation control of the reverse proxy device 5 (step S1006). The scenario information transmission unit 14 selects one scenario information element from the plurality of scenario information elements generated in advance. As mentioned above, the scenario information transmission unit 14 may select the scenario information on the basis of position information included in the operation start signal.

The scenario information transmission unit 14 transmits the selected scenario information to the network address of the forward proxy device 22 included in the transmission request (step S1007). As a result, the scenario information reception unit 223 of the forward proxy device 22 acquires the scenario information (step S1008). The scenario information reception unit 223 outputs the scenario information to the setting unit 224.

When the setting unit 224 acquires the scenario information, it selects one combination from the plurality of combinations including IP addresses and port numbers based on the current time point (step S1009). For example, if the current time point is between the plurality of time points listed in the scenario information elements, which have a predetermined interval, the setting unit 224 may select from the time points before and after the current time point, a pair including an IP address and a port number listed in the scenario information which is associated with the previous time point.

The setting unit 224 writes the IP address of the selected reverse proxy device 5 and the port number to the destination information referenced by the moving body information transmission unit 225 (step S1010). The destination information is recorded in a storage unit of the forward proxy device 22. Then, the setting unit 224 outputs to the vehicle-mounted unit 21, a destination setting request which includes the address of the forward proxy device as the destination of the vehicle information whose type indicates "important" (step S1011). The moving body information transmission unit 213 of the vehicle-mounted unit 21 stores the address of the forward proxy device 22 as the destination of the vehicle information whose type indicates "important" (step S1012). As a result, the vehicle information whose type indicates "important" is transmitted to the reverse proxy device 5 via the forward proxy device 22.

As a result, the vehicle-mounted unit 21 is capable of successively transmitting the vehicle information whose type indicates "important" to destinations represented by different IP addresses and port numbers. The vehicle-mounted unit 21 is capable of transmitting important vehicle information to the moving body management device 4 via a reverse proxy device 5 and a port that changes according to the time point. The vehicle-mounted unit 21 is capable of directly transmitting non-important vehicle information to the moving body management device 4. Consequently, it is possible to provide a communication control that ensures security by enhancing the degree of difficulty in accessing the moving body management device 4 and the reverse proxy device 5 that receive the vehicle information transmitted by each of the plurality of vehicles 20, and the vehicle information itself.

Figure 11:
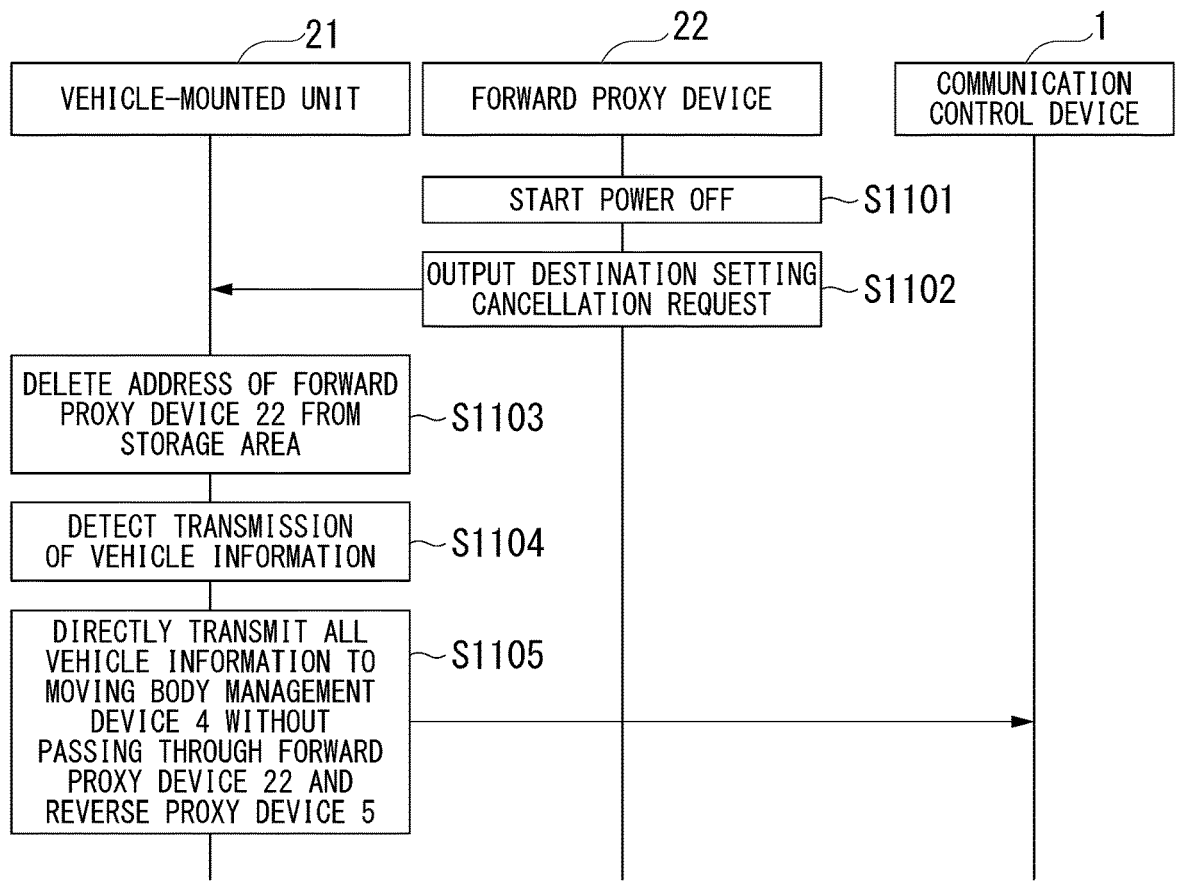
FIG. 11 is a fifth diagram showing the processing flow of the communication control system according to the present embodiment.

FIG. 11 is a fifth diagram showing the processing flow of the communication control system.

Next, the processing performed when the processing of the forward proxy device 22 is stopped will be described using FIG. 11.

The forward proxy device 22 starts power OFF processing as a result of an instruction and the like from the vehicle-mounted unit 21 (step S1101). In this case, the setting unit 224 of the forward proxy device 22 outputs a destination setting cancellation request to the vehicle-mounted unit 21 (step S1102). The destination setting cancellation request is, for example, a request that cancels a setting that causes the vehicle information to be transmitted via the forward proxy device 22 and the reverse proxy device 5.

The moving body information transmission unit 213 of the vehicle-mounted unit 21 deletes the address of the forward proxy device 22 stored as the destination of the vehicle information whose type indicates "important" from a storage area (step S1103). As a result, when the moving body information transmission unit 213 of the vehicle-mounted unit 21 detects transmission of vehicle information (step S1104), vehicle information whose type indicates "important" and vehicle information whose type indicates "non-important" are both directly transmitted to the moving body management device 4 without being passed through the forward proxy device 22 and the reverse proxy device 5 until another destination setting request is acquired (step S1105). That is to say, the moving body information transmission unit 213 directly transmits vehicle information to the moving body management device 4 irrespective of the type of vehicle information. It is clear that, even when vehicle information is directly transmitted to the moving body management device 4, the vehicle information is transferred to the moving body management device 4 via a relay device and the like on an intermediate communication network.

Figure 12:
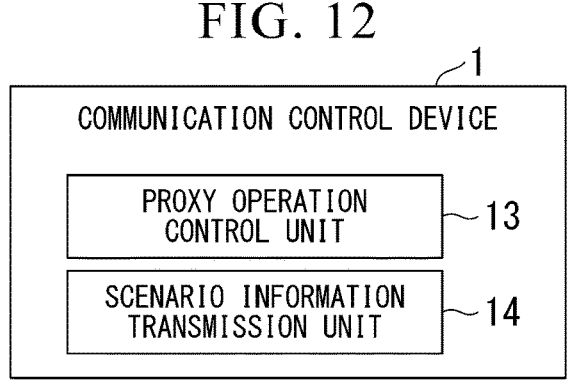
FIG. 12 is a diagram showing a minimum configuration of the communication control device according to the present embodiment.

FIG. 12 is a diagram showing a minimum configuration of the communication control device.

The communication control device 1 includes at least the proxy operation control unit 13 and the scenario information transmission unit 14.

Each of the plurality of reverse proxy devices 5 performs transfer of information transmitted and received between the mounted device and an information processing device that performs predetermined processing (for example, the moving body management device 4) using information transmitted by a mounted device (vehicle-mounted device 2) which is mounted on the moving body. The proxy operation control unit 13 selects one or more of the plurality of reverse proxy devices 5 based on scenario information. The proxy operation control unit 13 performs operation control of the selected reverse proxy device 5.

Furthermore, the scenario information transmission unit 14 selects scenario information used to perform operation control of the reverse proxy device 5 based on an operation start signal transmitted from the mounted device, and transmits the scenario information to the mounted device.

In this manner, the scenario information transmission unit 14 selects one scenario information element from among the plurality of scenario information elements in response to the start of operation of the mounted device, and transmits the scenario information to the mounted device. The scenario information includes a pair including an IP address and a port number of a reverse proxy device 5 that changes according to the time point in a time series. The proxy operation control unit 13 acquires an IP address and a port number based on the scenario information selected by the scenario information transmission unit 14. The proxy operation control unit 13 performs operation control of the reverse proxy device 5 such that communication with the reverse proxy device 5 of the IP address at the port number becomes possible. At this time, the proxy operation control unit 13 may perform, prior to the next time point, operation control for the reverse proxy device 5 of the IP address listed in the scenario information for the next time point.

Figure 13:
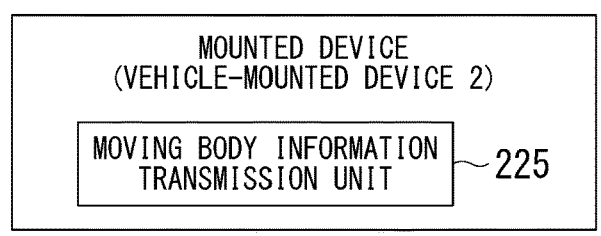
FIG. 13 is a diagram showing a minimum configuration of a mounted device (vehicle-mounted device) according to the present embodiment.

FIG. 13 is a diagram showing a minimum configuration of the mounted device (vehicle-mounted device).

The mounted device (vehicle-mounted device 2) includes at least a moving body information transmission unit 225. The moving body information transmission unit 225 transmits moving body information such that moving body information (vehicle information in the embodiment) of a moving body is transmitted to an information processing device (for example, the moving body management device 4) via the reverse proxy device 5 under operation control on the basis of a combination including an IP address, a port number, and a time point included in the scenario information.

In this manner, the moving body information transmission unit 225 refers to the scenario information to acquire an IP address and a port number on the basis of the current time point, and transmits moving body information to the acquired IP address and port number. That is to say, the moving body information transmission unit 225 transmits moving body information to a predetermined port of the reverse proxy device 5 under operation control based on the scenario information. In this manner, moving body information is transmitted according to the scenario information via a reverse proxy device 5 and a port that change according to the time point.

The devices described above have an internal computer system. Further, the processing sequences described above are stored in a program format in a computer-readable recording medium, and the processing above is performed by a computer reading and executing the program. Here, the computer-readable recording medium refers to a magnetic disk, a magnetic optical disk, a CD-ROM, a DVD-ROM, a semiconductor memory, and the like. Furthermore, the computer program may be transmitted to a computer by a communication line, and the computer receiving the transmission may execute the program.

Moreover, the program described above may be for realizing some of the functions mentioned above. In addition, the program may be one that realizes the functions mentioned above by being combined with a program already recorded on the computer system, as a so-called difference file (difference program).

What is claimed is:

1. A communication control device comprising:
a proxy operation control unit configured to select one or more of a plurality of reverse proxy devices that each performs transfer of information transmitted and received between an information processing device, which performs predetermined processing using information transmitted by a mounted device which is mounted on a moving body, and the mounted device, based on scenario information that includes a plurality of combinations including at least an IP address and a port number of the reverse proxy device and a time point, and performs operation control of the selected reverse proxy device; and
a scenario information transmission unit configured to select the scenario information used in the operation control of the reverse proxy device based on an operation start signal transmitted from the mounted device, and transmits the selected scenario information to the mounted device, wherein the proxy operation control unit sequentially selects the IP address and the port number based on the time point, based on a combination including the IP address, the port number, and the time included in the scenario information selected by the scenario information transmission unit, and performs operation control such that the port number of the reverse proxy apparatus of the IP address can be accessed based on the selected IP address and the port number.

2. The communication control device according to claim 1, wherein the scenario information transmission unit selects one scenario information element from a plurality of scenario information elements, and transmits the scenario information to the mounted device.

3. The communication control device according to claim 2, wherein the proxy operation control unit performs the operation control of one or more of the plurality of reverse proxy devices using each of the plurality of scenario information elements.

4. The communication control device according to claim 1, wherein the scenario information transmission unit selects the scenario information based on position information of the mounted device included in the operation start signal and transmits the scenario information to the mounted device.

5. A communication control system that at least includes:
a communication control device;
a mounted device which is mounted on a moving body; and
a plurality of reverse proxy devices each of which is configured to perform transfer of information transmitted and received between an information processing device that performs predetermined processing using information transmitted from the mounted device, and the mounted device; wherein
the communication control device includes;
a proxy operation control unit configured to select one or more of the plurality of reverse proxy devices based on scenario information that includes a plurality of combinations including at least an IP address and a port number of the reverse proxy device and a time point, and perform operation control of the selected reverse proxy device, and
a scenario information transmission unit configured to select the scenario information used in the operation control of the selected reverse proxy device based on an operation start signal transmitted from the mounted device, and transmit the selected scenario information to the mounted device, wherein the proxy operation control unit sequentially selects the IP address and the port number based on the time point, based on a combination including the IP address, the port number, and the time included in the scenario information selected by the scenario information transmission unit, and performs operation control such that the port number of the reverse proxy apparatus of the IP address can be accessed based on the selected IP address and the port number,
and the mounted device includes;
a moving body information transmission unit configured to transmit moving body information such that the moving body information of the moving body is transmitted to the information processing device via the reverse proxy device under the operation control based on a combination including the IP address, the port number, and the time point included in the scenario information.

6. A mounted device connected to a communication control system that at least includes:
a communication control device;
a mounted device which is mounted on a moving body; and
a plurality of reverse proxy devices, each of which is configured to perform transfer of information transmitted and received between an information processing device that performs predetermined processing using information transmitted from a mounted device, and the mounted device;
wherein the communication control device includes;
a proxy operation control unit configured to select one or more of the plurality of reverse proxy devices based on scenario information that includes a plurality of combinations including at least an IP address and a port number of the reverse proxy device and a time point, and perform operation control of the selected reverse proxy device, and
a scenario information transmission unit configured to select the scenario information used in the operation control of the reverse proxy device based on an operation start signal transmitted from the mounted device, and transmit the selected scenario information to the mounted device, wherein the proxy operation control unit sequentially selects the IP address and the port number based on the time point, based on a combination including the IP address, the port number, and the time included in the scenario information selected by the scenario information transmission unit, and performs operation control such that the port number of the reverse proxy apparatus of the IP address can be accessed based on the selected IP address and the port number, and the mounted device includes a moving body information transmission unit configured to transmit moving body information such that moving body information of the moving body is transmitted to the information processing device via the reverse proxy device under the operation control based on a combination including the IP address, the port number, and the time point included in the scenario information.

7. The mounted device according to claim 6 wherein the moving body information transmission unit determines, based on the type of the moving body information, whether to transmit the moving body information to the information processing device via the reverse proxy device, or to transmit the moving body information to the information processing device without passing through the reverse proxy device, and transmits the moving body information to the information processing device according to the determination result.

* * * * *